United States Patent
Inoue et al.

(10) Patent No.: US 6,580,921 B1
(45) Date of Patent: Jun. 17, 2003

(54) DUAL-MODE MOBILE TELEPHONE TERMINAL

(75) Inventors: Seiya Inoue, Tokyo (JP); Kozo Seo, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/180,135

(22) PCT Filed: Mar. 4, 1997

(86) PCT No.: PCT/JP97/00651

§ 371 (c)(1), (2), (4) Date: Nov. 3, 1998

(87) PCT Pub. No.: WO98/39859

PCT Pub. Date: Sep. 11, 1998

(51) Int. Cl.[7] .............................. H04B 1/38; H04Q 7/20
(52) U.S. Cl. ..................... 455/552; 455/437; 455/550
(58) Field of Search .................... 455/552, 553, 455/12.1, 426, 575, 550, 425, 437, 440, 442

(56) References Cited

U.S. PATENT DOCUMENTS

| | | | | |
|---|---|---|---|---|
| 4,972,456 A | * | 11/1990 | Kaczmarek et al. | 455/436 |
| 5,020,093 A | * | 5/1991 | Pireh | 455/552 |
| 5,127,042 A | * | 6/1992 | Gillig et al. | 455/552 |
| 5,228,074 A | * | 7/1993 | Mizikovsky | 455/553 |
| 5,260,988 A | * | 11/1993 | Schellinger et al. | 455/552 |
| 5,287,541 A | * | 2/1994 | Davis et al. | 455/427 |
| 5,301,353 A | * | 4/1994 | Borras et al. | 455/9 |
| 5,396,653 A | * | 3/1995 | Kivari et al. | 455/88 |
| 5,490,284 A | * | 2/1996 | Itoh et al. | 455/11.1 |
| 5,535,430 A | | 7/1996 | Aoki et al. | |
| 5,535,432 A | | 7/1996 | Dent | |
| 5,628,049 A | * | 5/1997 | Suemitsu | 455/11.1 |
| 5,715,297 A | * | 2/1998 | Wiedeman | 455/427 |
| 5,732,359 A | * | 3/1998 | Baranowsky, II et al. | 455/552 |
| 5,752,204 A | * | 5/1998 | Epperson et al. | 455/575 |
| 5,828,951 A | * | 10/1998 | Suemitsu | 455/575 |
| 5,842,122 A | * | 11/1998 | Schellinger et al. | 455/403 |
| 5,884,168 A | * | 3/1999 | Kolev et al. | 455/432 |
| 5,884,189 A | * | 3/1999 | Yamazaki et al. | 455/552 |
| 5,903,835 A | * | 5/1999 | Dent | 455/427 |
| 5,950,127 A | * | 9/1999 | Nitta et al. | 455/426 |
| 5,966,667 A | * | 10/1999 | Halloran et al. | 455/552 |
| 5,987,334 A | * | 11/1999 | Kaku | 455/552 |
| 5,991,599 A | * | 11/1999 | Uchikawa | 455/20 |
| 6,006,106 A | * | 12/1999 | Cook et al. | 455/552 |
| 6,011,978 A | * | 1/2000 | Ault et al. | 455/552 |
| 6,052,560 A | * | 4/2000 | Karabinis | 455/12.1 |
| 6,072,768 A | * | 6/2000 | Wiedeman et al. | 370/58 |
| 6,119,003 A | * | 9/2000 | Kukkohovi | |
| 6,138,010 A | * | 10/2000 | Rabe et al. | 455/426 |
| 6,192,224 B1 | * | 2/2001 | Grayson et al. | 455/168.1 |

FOREIGN PATENT DOCUMENTS

| | | | |
|---|---|---|---|
| GB | 2319438 | * | 5/1996 |
| WO | 9301688 | | 1/1993 |
| WO | 95/23485 | * | 8/1995 |
| WO | 9608878 | | 3/1996 |
| WO | WO 9612377 A1 | | 4/1996 |
| WO | 96/34503 | * | 10/1996 |

\* cited by examiner

Primary Examiner—Charles N. Appiah
(74) Attorney, Agent, or Firm—Rothwell, Figg, Ernst & Manbeck (57) ABSTRACT

A portable-type dual-mode mobile telephone terminal apparatus including a satellite wireless communication controller 2 for performing satellite communications via a communications satellite and a cellular wireless communication controller 8 for performing cellular communications via a ground station, and interfacing means 21 for making interfacing between the satellite wireless communication controller 2 and the LCD/keypad junction unit 14 of the cellular wireless communication controller 8. The interfacing means 21 performs software interfacing under the control of a program while address decoders and input and output ports perform electrical interfacing.

5 Claims, 12 Drawing Sheets

FIG. 12

DUAL-MODE MOBILE TELEPHONE TERMINAL

TECHNICAL FIELD

The present invention relates to a dual-mode mobile telephone terminal apparatus and, more particularly, to a portable-type, dual-mode mobile telephone terminal apparatus capable of performing satellite communications via a communications satellite and cellular communications via a base station on the ground (hereinafter referred to as a "ground station").

BACKGROUND ART

Figure 11:
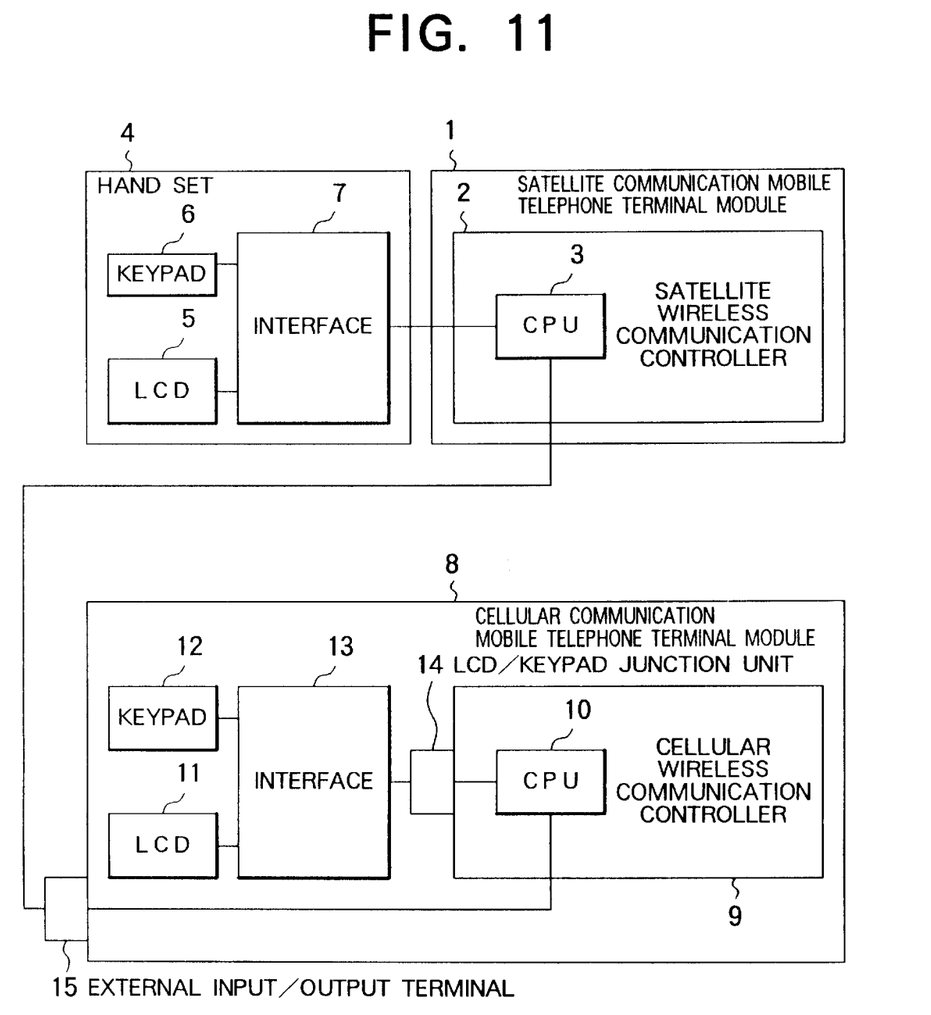
FIG. 11 is a block diagram generally showing a conventional dual-mode mobile telephone terminal apparatus.

FIG. 11 is a block diagram of a conventional dual-mode mobile telephone terminal apparatus. Referring to FIG. 11, there are shown satellite-communication mobile telephone terminal module (hereinafter referred to as "satellite terminal module") 1, a satellite wireless communication controller 2 mounted in the satellite terminal module 1, CPU 3 in the satellite wireless communication controller 2, for communicating with another terminal apparatus via a communications satellite (not shown) under the control of software, and a hand set 4 composed of LCD 5, a keypad 6 and an interface circuit 7. The interface circuit 7 makes signals coming in from LCD 5 and the keypad 6 compatible with the interface of CPU 3.

There are also shown a hand-set type, cellular communication mobile telephone terminal module 8 for terrestrial communications (hereinafter referred to as "cellular terminal module") having an external input/output terminal 15 through which a monitoring control signal and the like are input and output, a cellular wireless communication controller 9 mounted in the cellular terminal module 8, CPU 10 in the cellular wireless communication controller 9, for communicating with another terminal apparatus via a ground station (not shown) under the control of software, LCD 11 on the cellular terminal module 8, a keypad 12 on the cellular terminal module 8, an interface circuit 13 between CPU 10 and LCD 11 and keypad 12, an LCD/keypad junction unit 14 connected to the interface circuit 13, and the external input/output terminal 15 such as a connector attached onto the casing of the cellular terminal module 8.

Figure 12:
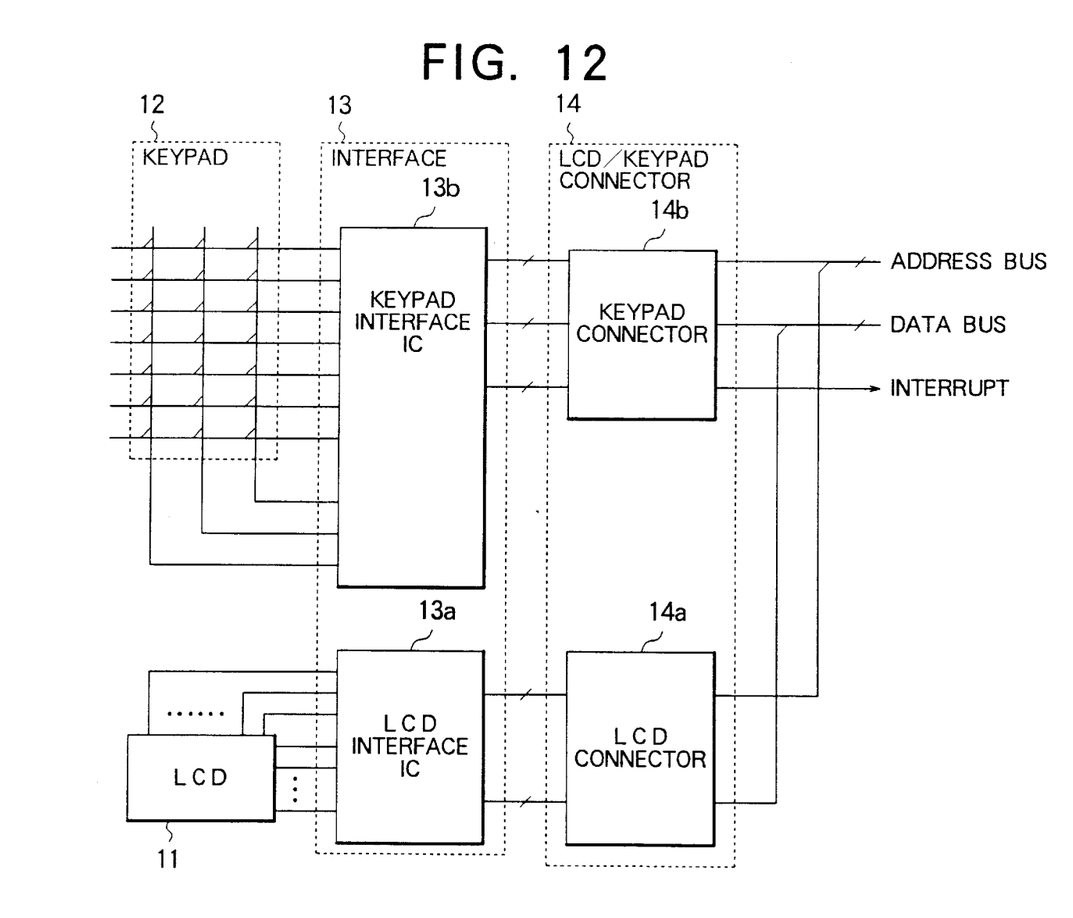
FIG. 12 is a block diagram showing in detail an interface circuit 13 and LCD/keypad junction unit 14 in the conventional dual-mode mobile telephone terminal apparatus.

FIG. 12 shows in detail the interface circuit 13 and LCD/keypad junction unit 14 in a conventional dual-mode mobile telephone terminal apparatus. Referring to FIG. 12, there are shown an LCD interface IC 13a and a keypad interface IC 13b, both of which form the interface circuit 13.

Also shown are an LCD connector 14a and a keypad connector 14b, both of which forms the LCD/keypad junction unit 14.

The operation of the conventional art thus constructed is now discussed. When a telephone call is placed entering a telephone number of a destination, namely, a party to be called, and referring to the display of LCD 5, a required signal is fed to CPU 3 in the satellite terminal module 1, and CPU 3 decides whether the call is to be placed by the satellite terminal module 1 via the communications satellite (not shown) or by the cellular terminal module 8 via the ground station (not shown).

After the decision, when the call is successfully placed by either the cellular terminal module 8 or the satellite terminal module 1, a user starts a voice communication using the hand set 4 through one of the terminal modules that has successfully placed the call.

Most of the satellite terminal modules widely and currently manufactured in the world, as the satellite terminal module 1, are as large as of a sheet A4 or B5 size at the smallest. Since the communications satellites, positioned at a geostationary orbit 36000 km above the equator, suffer a severe wireless wave attenuation, they are in need of a relatively large antenna and a high-output power, and as communications satellites at a low earth orbit (LEO) or at an intermediate earth orbit (IEO) are going to be used from now on, a portable handheld type, satellite terminal module 1 works even with a smaller antenna such as a bar antenna and a low output power, and the hand set 4, satellite terminal module 1 and cellular terminal module 8 in FIG. 11 may be integrated into a handheld side communication terminal.

A variety of systems are available in conventional dual-mode mobile telephone terminal apparatuses in terms of the cellular communication system of the cellular terminal module 8, including PDC (Personal Digital Cellular in a Japanese standard mobile communication system), GSM (Global System for Mobile Communication in a European standard mobile communication system), DAMPS (Digital Advanced Mobile Phone Service in a U.S. standard mobile communication system), and CDMA (Code Division Multiple Access in another U.S. standard mobile communication system different from DAMPS), and they are different from each other in specification, for example, in interfacing conditions of the external input/output terminal 15, and some systems dispense with the external input/output terminal 15.

If an attempt is made to integrate the hand set 4, satellite terminal module 1, and cellular terminal module 8 shown in FIG. 11 into one handheld communications terminal, the interfacing conditions of the external input/output terminal 15 needs modifying depending on the cellular communication system of the cellular terminal module 8 to be integrated, or an external input/output terminal itself needs to be newly installed, and for this reason, the standardization of hardware is difficult, and the manufacturing cost of the hardware is high, and when one cellular wireless communication controller is changed to another cellular wireless communication controller, a hardware modification is needed, pushing the cost of the apparatus.

The present invention has been developed to resolve the above problems, and it is an object of the present invention to provide a dual-mode mobile telephone terminal apparatus, wherein a satellite terminal module and a cellular terminal module are integrated at a low cost with a minimum hardware modification involved, requiring no increase in the component count of the apparatus, and a cellular wireless communication controller is changed from one cellular communication system to another with a minimum hardware modification involved.

DISCLOSURE OF THE INVENTION

To achieve the above object, the dual-mode mobile telephone terminal apparatus of the present invention comprises a satellite wireless communication controller for performing satellite communications with another terminal apparatus via a communications satellite, a cellular wireless communication controller, including an input/output junction unit, for performing cellular communications with another terminal apparatus via a ground station, and interfacing means, arranged between the satellite wireless communication controller and the input/output junction unit of the cellular wireless communication controller, for making interfacing between the satellite wireless communication controller and the input/output junction unit of the cellular wireless communication controller.

The dual-mode mobile telephone terminal apparatus of the present invention further comprises input means into which a telephone number of a destination is entered to place a call, and display means for displaying the telephone number input through the input means, wherein the satellite wireless communication controller, the cellular wireless communication controller, the interfacing means, the input means and the display means are integrated with a hand set in a unitary body.

The cellular wireless communication controller outputs in/out-of-area information that indicates whether the apparatus is in or out of a cellular communication service area, while the satellite wireless communication controller receives the in/out-of-area information from the cellular wireless communication controller, and when the satellite wireless communication controller determines that the apparatus is in the cellular communication service area, it causes the cellular wireless communication controller to perform cellular communications, and when the satellite wireless communication controller determines that the apparatus is out of the cellular communication service area, it performs satellite communications.

The present invention further comprises a plurality of cellular wireless communication controllers of different cellular communication system types and the interfacing means respectively compatible with the cellular wireless communication controllers of different cellular communication system types, wherein when one of the plurality of cellular wireless communication controllers performs cellular communications, the interfacing means compatible with the one cellular wireless communication controller makes interfacing between the satellite wireless communication controller and the input/output junction unit of the one cellular wireless communication controller.

The dual-mode mobile telephone terminal apparatus of the present invention further comprises a plurality of cellular wireless communication controllers of different cellular communication system types, first interfacing means for making software interfacing under the control of a program compatible with the cellular communication system of one cellular wireless communication controller in use, out of the plurality of cellular wireless communication controllers, and a plurality of second interfacing means, respectively arranged for the plurality of cellular wireless communication controllers, for performing electrical interfacing, wherein when one of the plurality of cellular wireless communication controllers performs cellular communications, the first interfacing means makes software interfacing under the control of the program compatible with the cellular communication system of the one cellular wireless communication controller while the second interfacing means makes electrical interfacing compatible with the one cellular wireless communication controller, in connection with the interfacing activity between the satellite wireless communication controller and the input/output junction unit of the cellular wireless communication controllers.

The dual-mode mobile telephone terminal apparatus of the present invention comprises, in the interfacing means, first interfacing means for making software interfacing under the control of a program compatible with the cellular communication system of one cellular wireless communication controller actually mounted, out of a plurality of cellular wireless communication controllers of different cellular communication system types expected to be mounted, a plurality of second interfacing means, respectively arranged for the plurality of cellular wireless communication controllers, for performing electrical interfacing, with the first interfacing means arranged separately from the plurality of second interfacing means, and selection means for selecting one second interfacing means, among the plurality of second interfacing means, compatible with the mounted cellular wireless communication controller, wherein when one of the plurality of cellular wireless communication controllers performs cellular communications, the first interfacing means makes software interfacing under the control of the program compatible with the cellular communication system of the one cellular wireless communication controller, while the second interfacing means makes electrical interfacing compatible with the one cellular wireless communication controller selected by the selection means, in connection with the interfacing activity between the satellite wireless communication controller and the input/output junction unit of the cellular wireless communication controllers, In the dual-mode mobile telephone terminal apparatus of the present invention, the interfacing means is divided into first interfacing means for making software interfacing under the control of a program and second interfacing means for making electrical interfacing wherein a CPU that executes a program in the satellite wireless communication controller to perform satellite communications further makes software interfacing under the control of the program of the first interfacing means for the first interfacing means while the second interfacing means is arranged separately from the satellite wireless communication controller and the cellular wireless communication controller.

In the dual-mode mobile telephone terminal apparatus of the present invention, the CPU that executes the program in the satellite wireless communication controller to perform satellite communications further makes software interfacing under the control of the program of the first interfacing means for the first interfacing program.

In the dual-mode mobile telephone terminal apparatus of the present invention, the interfacing means is divided into first interfacing means for making software interfacing under the control of a program and second interfacing means for making electrical interfacing, wherein a CPU that executes a program in the cellular wireless communication controller to perform cellular communications further makes software interfacing under the control of the program of the first interfacing means for the first interfacing means while the second interfacing means is arranged separately from the satellite wireless communication controller and the cellular wireless communication controller.

In the dual-mode mobile telephone terminal apparatus of the present invention, the CPU that executes the program in the cellular wireless communication controller to perform cellular communications further makes software interfacing of the first interfacing means for the first interfacing means.

BEST MODE FOR CARRYING OUT THE INVENTION (1) First embodiment

Figure 1:
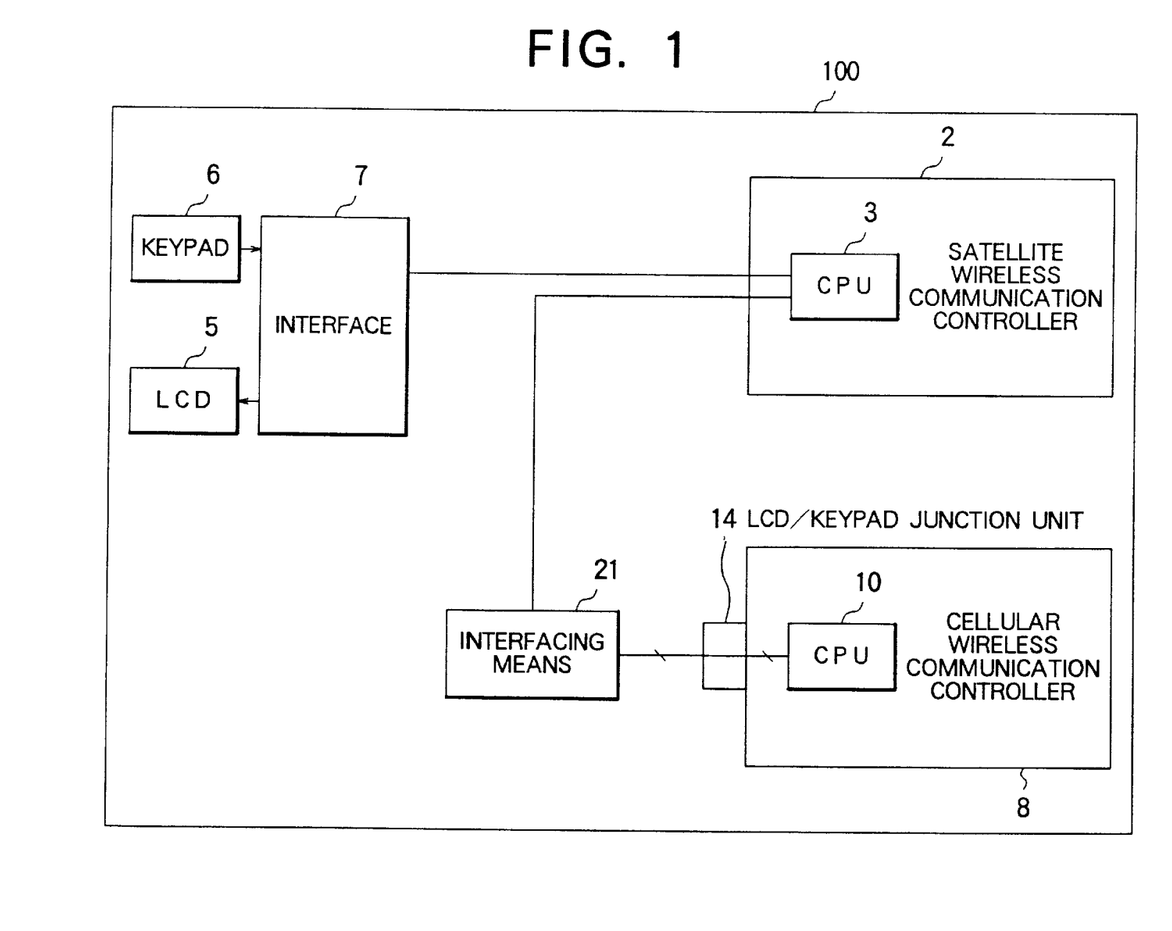
FIG. 1 is a block diagram generally showing the construction of a dual-mode mobile telephone terminal apparatus according to a first embodiment of the present invention.

FIG. 1 shows generally the construction of a dual-mode mobile telephone terminal apparatus of a first embodiment of the present invention.

Figure 2:
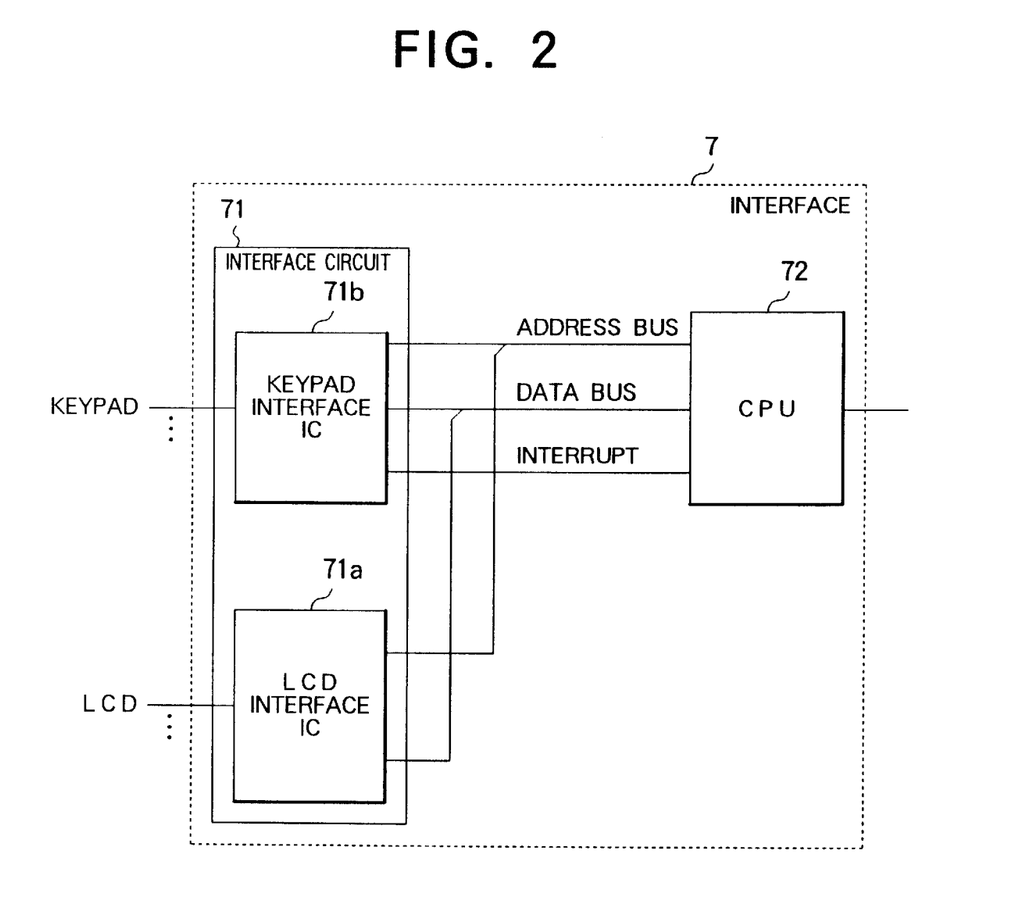
FIG. 2 is a block diagram showing in detail an interface 7 of the first embodiment.
Figure 3:
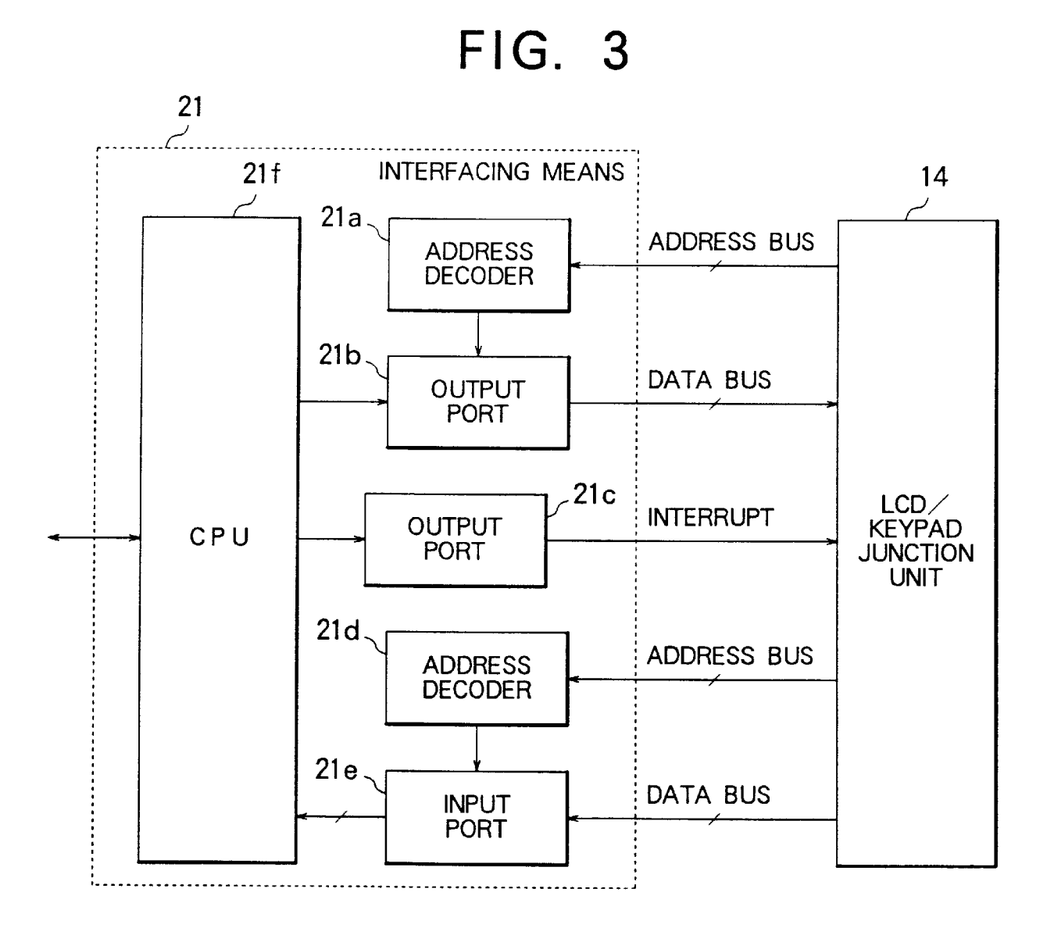
FIG. 3 is a block diagram showing in detail an interface 21 of the first embodiment.

In FIG. 1, components described with reference to FIG. 11 and FIG. 12 are designated with the same reference numerals, and the discussion about them is not repeated, and there are shown a satellite wireless communication controller 2 including CPU 3 that performs satellite communications via a communications satellite under the control of a program, LCD 5 as display means, a keypad 6 as input means, an interface circuit 7 which is shown in greater detail in FIG. 2, a cellular wireless communication controller 8, including CPU 10 that performs cellular communications via a ground station under the control of a program, and connected to associated components external to it via an LCD/keypad junction unit 14, interfacing means 21, which is shown in greater detail in FIG. 3, is arranged between the satellite wireless communication controller 2 and the LCD/keypad junction unit 14 of the cellular wireless communication controller 8, and makes interfacing between CPU 3 of the satellite wireless communication controller 2 and the LCD/keypad junction unit 14 of the cellular wireless communication controller 8, and all of these components are integrated with a hand set in a unitary body, forming a handheld-type, dual-mode mobile telephone terminal apparatus 100. Dual-mode mobile telephone terminal apparatuses 200–800 to be described later in connection with respective second embodiments to eighth embodiments are also of a handheld type.

The satellite wireless communication controller 2 and the cellular wireless communication controller 8 remain unchanged from respective conventional ones mounted on circuit boards, and the cellular wireless communication controller 8 is available in a variety of cellular communication system types including PDC, GSM, DAMPS, CDMA. Memories that store programs for CPUs, such as the program for CPU 3 in the satellite wireless communication controller 2 and the program for CPU 10 of the cellular wireless communication controller 8, are employed, though not shown in FIG. 1, and the same is true of the second—eighth embodiments.

FIG. 2 shows the interface circuit 7 of the first embodiment in greater detail.

Referring to FIG. 2, there are shown an interface circuit 71, like the interface circuit 13 shown in FIG. 12, comprising a keypad interface IC 71a and an LCD interface IC 71b and CPU 72 that interfaces with CPU 3 in the satellite wireless communication controller 2 in serial transmission based on the RS-232-C interface.

FIG. 3 shows in greater detail the interfacing means 21 of the first embodiment.

Referring to FIG. 3, there are shown address decoders 21a and 21d for decoding address data that comes in through address buses from the LCD/keypad junction unit 14, an output port 21b for outputting data to the LCD/keypad junction unit 14 through a data bus based on the address decoded by the address decoder 21a, an output port 21c for outputting an interrupt signal to the LCD/keypad junction unit 14, and an input port 21e for receiving data from the LCD/keypad junction unit 14 through a data bus based on the address decoded by the address decoder 21d, and these components make electrical interfacing of the interfacing activity carried out between CPU 3 of the satellite wireless communication controller 2 and the LCD/keypad junction unit 14 of the cellular wireless communication controller 8.

CPU 21f performs software interfacing of the interfacing activity carried out between CPU 3 of the satellite wireless communication controller 2 and the LCD/keypad junction unit 14 of the cellular wireless communication controller 8, specifically, serially interfaces with CPU 3 in the satellite wireless communication controller 2, converts data format, and interfaces with CPU 10 in the cellular wireless communication controller 8. More specifically, under the control of a program, CPU 21f in the interfacing means 21 performs a variety of monitoring control processes to CPU 10 in the cellular wireless communication controller 8 through serial interface, converts the data format of the interfacing signal with CPU 3 into the interfacing format of the LCD/keypad junction unit 14, and converts the signal generated at the pressing of the keypad 6 into a signal compatible with the cellular wireless communication controller 8 through the address bus for keypad interface, data bus and interruption with the LCD/keypad junction unit 14. The data format conversion function is performed using a table.

The operation of the dual-mode mobile telephone terminal apparatus 100 of the first embodiment thus constructed is now discussed.

When a call is placed, a telephone number of a party to be called is input to the keypad 6 referring to the display on LCD 5.

A required signal is sent to CPU 3 built in the satellite wireless communication controller 2, and CPU 3 then decides whether the call is to be placed through the satellite wireless communication controller 2 for satellite communications or through the cellular wireless communication controller 8 for cellular communications.

The first embodiment employs, as a reference on which the decision is based, in/out-of-area information that indicates whether a radio wave, which is transmitted from the ground station is received by the cellular wireless communication controller 8 at a certain signal level or higher, wherein CPU 10 in the cellular wireless communication controller 8 is linked to CPU 3 in the satellite terminal module 1 through the LCD/keypad junction unit 14 and interfacing means 21, and CPU 3 works in the following algorithm: when CPU 3 in the satellite terminal module 1 determines from the in/out-of-area information that the apparatus is within the cellular service area, it causes the cellular wireless communication controller 8 to place the call, and when CPU 3 determines that the apparatus is out of the cellular service area or when an attempt to establish a connection fails, the satellite wireless communication controller 2 places the call.

When CPU 3 in the satellite wireless communication controller 2 determines that the apparatus is in the cellular service area, the cellular wireless communication controller 8 places a call, and when CPU 3 determines that the apparatus is out of the cellular service area or when an attempt to establish a connection fails, the satellite wireless communication controller 2 places the call.

When the cellular wireless communication controller 8 places the call, the interfacing means 21 makes software interfacing such as required electrical conversion and data format conversion, and the telephone number entered through the keypad 6 is converted electrically and in software to be compatible with the LCD/keypad junction unit 14, and such converted telephone number is sent to CPU 10 through the LCD/keypad junction unit 14 of the cellular wireless communication controller 8, and CPU 10 in the cellular wireless communication controller 8 places the call based on the converted telephone number.

In the dual-mode mobile telephone terminal apparatus 100 of the first embodiment, CPU 21f in the interfacing means 21 makes software interfacing such as data format conversion by carrying out a program, in accordance with the cellular communication system type of the cellular wireless communication controller 9 mounted in the dual-mode mobile telephone terminal apparatus 100, and the address decoders 21a and 21d, input and output ports 21b, 21c and 21e make electrical interfacing, and there is thus no need for the connection with CPU 3 in the satellite wireless communication controller 2 via the external input/output terminal 15 in accordance with the cellular communication system type of the cellular wireless communication controller 9.

As a result, even when the cellular wireless communication controller 9 is changed in cellular communication system type in the dual-mode mobile telephone terminal apparatus 100 of the first embodiment, no hardware modification is required unlike the conventional art in which the external input/output terminal 15 is replaced or newly attached, as long as the electrical interfacing specifications of the address decoders 21a and 21d and the input and output ports 21b, 21c and 21e remain unchanged, and all that is necessary is a software modification in the program for CPU 21f in the interfacing means 21, and the resulting dual-mode mobile telephone terminal apparatus is compatible with a variety of cellular communication system types with a common hardware, and the manufacturing cost of the apparatus is thus substantially reduced.

(2) Second embodiment

Although the above-described first embodiment employs a single cellular wireless communication controller 8, a second embodiment employs a plurality (two herein, for simplicity) of cellular wireless communication controllers of different cellular communication system types such as PDC and GSM, for example.

Figure 4:
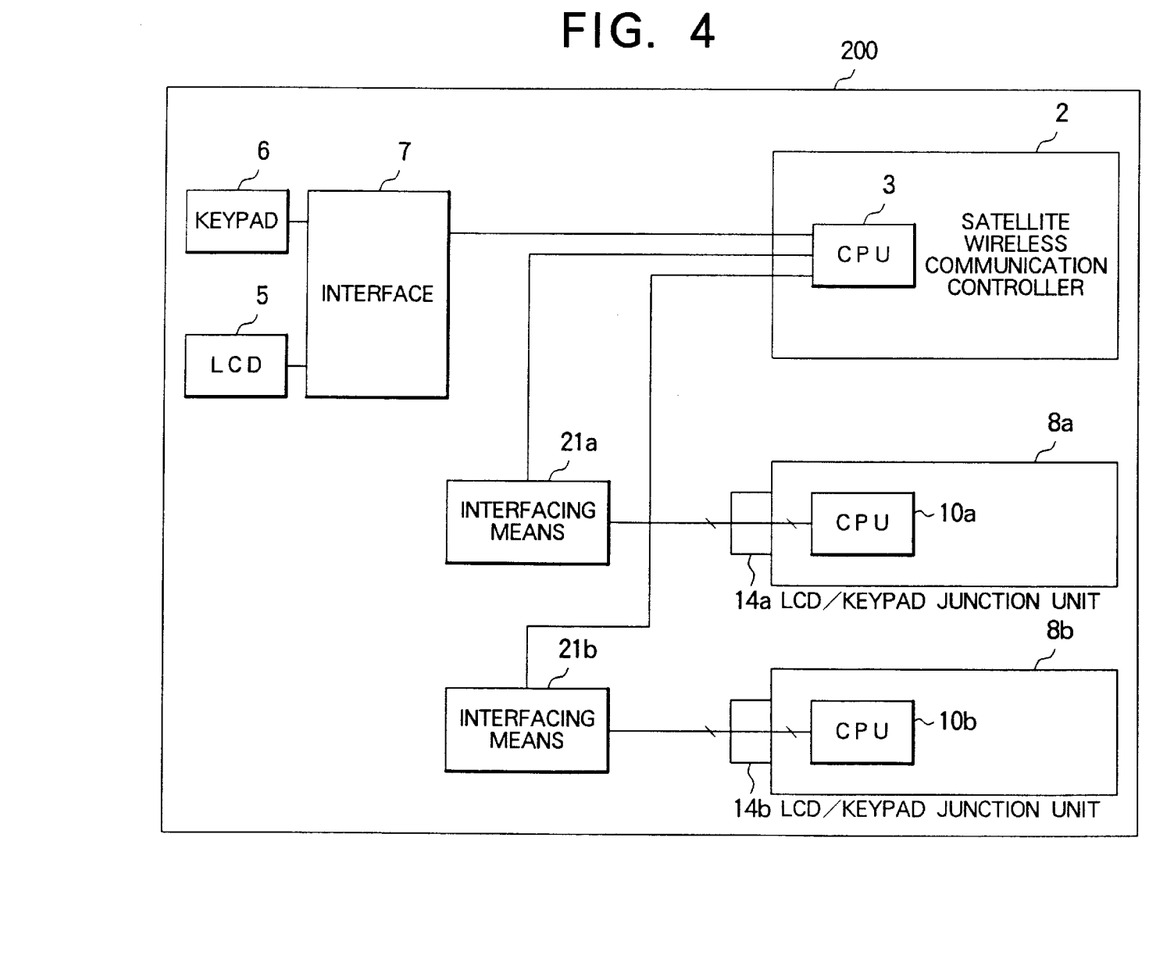
FIG. 4 is a block diagram showing generally a dual-mode mobile telephone terminal apparatus according to a second embodiment of the present invention.

FIG. 4 shows generally a dual-mode mobile telephone terminal apparatus 200 of the second embodiment of the present invention.

As shown, components identical to those described with reference to FIG. 1 in connection with the first embodiment are designated with the same reference numerals, and the discussion about them is not repeated, and cellular wireless communication controllers 8a and 8b are different from each other, for example, PDC and GSM, respectively, and are respectively provided with CPUs 10a and 10b and LCD/keypad junction units 14a and 14b for cellular communications. The rest of the construction of the second embodiment remains unchanged from that of the first embodiment, and the components identical to those in the first embodiment are designated with the same reference numerals and the discussion about them is not repeated.

Since the dual-mode mobile telephone terminal apparatus 200 of the second embodiment is equipped with the cellular wireless communication controllers 8a and 8b of different cellular communication system types, cellular communications are performed by selecting between the cellular wireless communication controllers 8a and 8b.

The dual-mode mobile telephone terminal apparatus 200 of the second embodiment has the same advantage as that of the first embodiment, and is compatible with two cellular communication system types or more.

(3) Third embodiment

Figure 5:
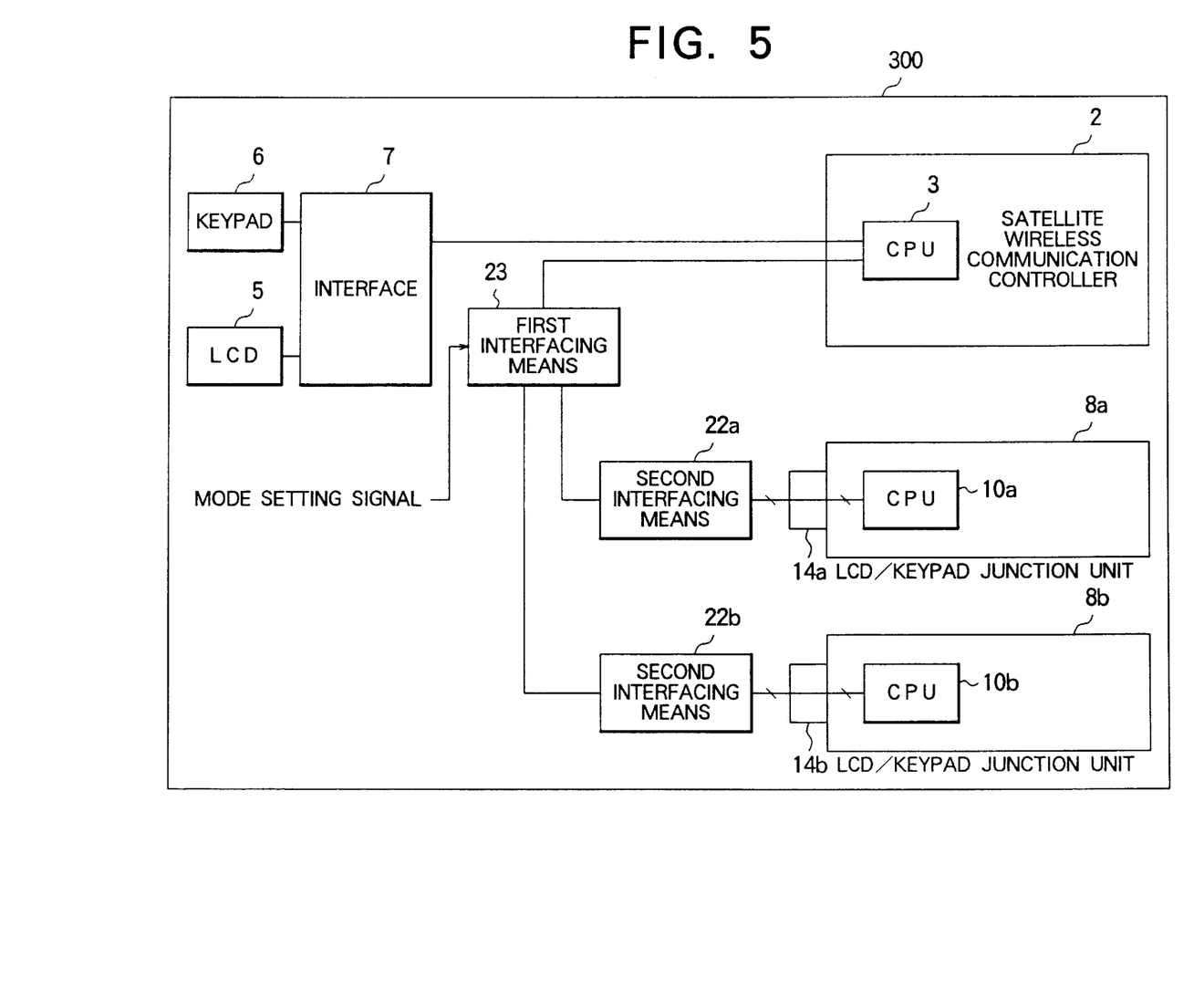
FIG. 5 is a block diagram showing generally a dual-mode mobile telephone terminal apparatus according to a third embodiment of the present invention.

FIG. 5 shows generally a dual-mode mobile telephone terminal apparatus 300 of a third embodiment of the present invention.

The second embodiment employs one interfacing means for each of the cellular communication system types mounted while the dual-mode mobile telephone terminal apparatus of the third embodiment splits, into two functions, the interfacing function performed between CPU 3 in the satellite wireless communication controller 2 and each of the LCD/keypad junction units 14a and 14b in the respective cellular wireless communication controllers 8a and 8b, and the software interfacing executed by CPU 21f (see FIG. 3) in the first embodiment under the control of the program is carried out by common first interfacing means 23, while the electrical interfacing executed by the address decoders 21a and 21d and the input output ports 21b, 21c and 21d in the first embodiment is performed by second interfacing means 22a and 22b of the respective cellular wireless communication controllers 8a and 8b corresponding to the respective cellular communication systems.

No further description using drawings is provided for the third embodiment, and the first interfacing means 23 includes a CPU having substantially the same function as that of CPU 21f in the interfacing means 21 in the first embodiment, and when the cellular wireless communication controllers are mounted, the cellular communication systems of the cellular wireless communication controllers 8a and 8b to be used are set using DIP switches (not shown) and a mode setting signal for each cellular communication system set is output and in response to the mode setting signal, the first interfacing means 23 makes software interfacing by switching the program for data format conversion and other processes, which is executed by CPU 21f in the first embodiment, to match the cellular communication systems, and the second interfacing means 22a and 22b are provided with the address decoders 21a and 21d and the input and output ports 21b, 21c and 21e for respective cellular communication systems to make electrical interfacing. The rest of the construction of the third embodiment remains unchanged from that of the second embodiment, and components identical to those described with reference to FIG. 2 in connection with the second embodiment are designated with the same reference numerals.

For this reason, the dual-mode mobile telephone terminal apparatus 300 of the third embodiment has the same advantage as that of the second embodiment, and the hardware of the first interfacing means 23 for making software interfacing for data format conversion and other processes is shared by the cellular communication systems, reducing the cost of the apparatus.

In the second embodiment, the second interfacing means 22a and 22b are respectively arranged for the cellular wireless communication controllers 8a and 8b of different cellular communication system types, but when the electrical specifications of the cellular wireless communication controllers 8a and 8b are identical even with their cellular communication system types being different, a single second interfacing means commonly works for the two. The same is true of the following embodiments.

(4) Fourth embodiment

Figure 6:
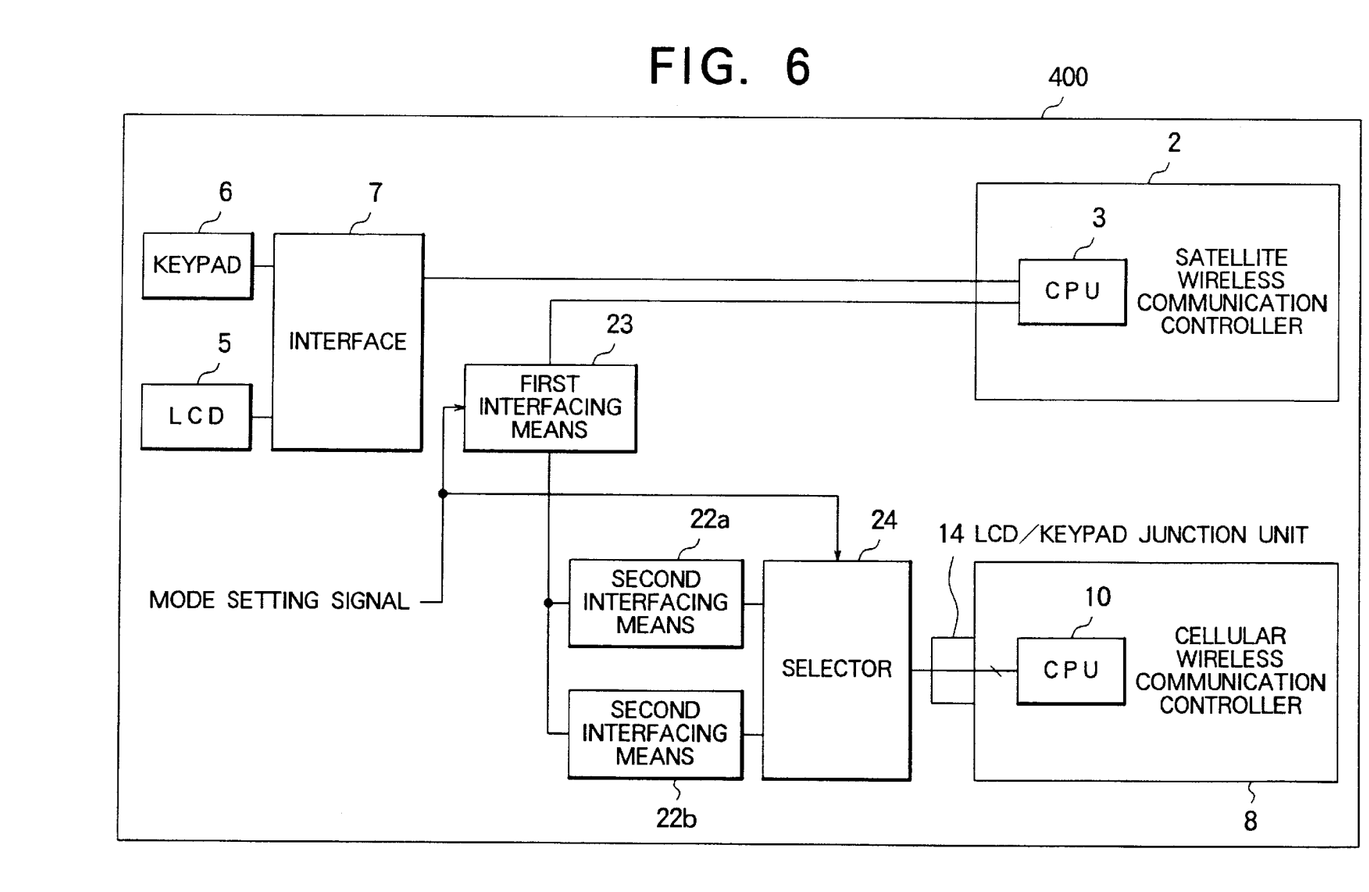
FIG. 6 is a block diagram showing generally a dual-mode mobile telephone terminal apparatus according to a fourth embodiment of the present invention.

FIG. 6 shows generally a dual-mode mobile telephone terminal apparatus 400 of a fourth embodiment of the present invention.

Although the dual-mode mobile telephone terminal apparatus 400 of the fourth embodiment employs a single cellular wireless communication controller 8, the dual-mode mobile telephone terminal apparatus 400 accommodates a cellular wireless communication controller of a different cellular communication system type because the dual-mode mobile telephone terminal apparatus 400 comprises first interfacing means 23 for performing software interfacing for data format conversion or other processes under the control of a program, second interfacing means 22a and 22b for performing electrical interfacing in accordance with the cellular communication systems of cellular wireless communication controllers expected to be mounted (two controllers herein, for simplicity), and a selector 24 for selecting one of the outputs of the second interfacing means 22a and 22b in response to the mode setting signal for the type of cellular communication system.

When the cellular wireless communication controller of different electrical interfacing specifications is mounted in the dual-mode mobile telephone terminal apparatus of the fourth embodiment, the cellular communication system of the cellular wireless communication controller to be used is set using DIP switches (not shown) and a mode setting signal for the cellular communication system is output and in response to the mode setting signal, the program of the first interfacing means 23 is switched to the one compatible with the cellular communication system set, and one of the outputs of the second interfacing means 22a and 22b is automatically selected, and the data format conversion and electrical interfacing are performed in accordance with the cellular communication system of the cellular wireless communication controller 8 mounted.

The dual-mode mobile telephone terminal apparatus 400 of the fourth embodiment thus assures a wide compatibility, needing no particular modification, even when a cellular wireless communication controller having different electrical interfacing specifications is mounted.

(5) Fifth embodiment

Figure 7:
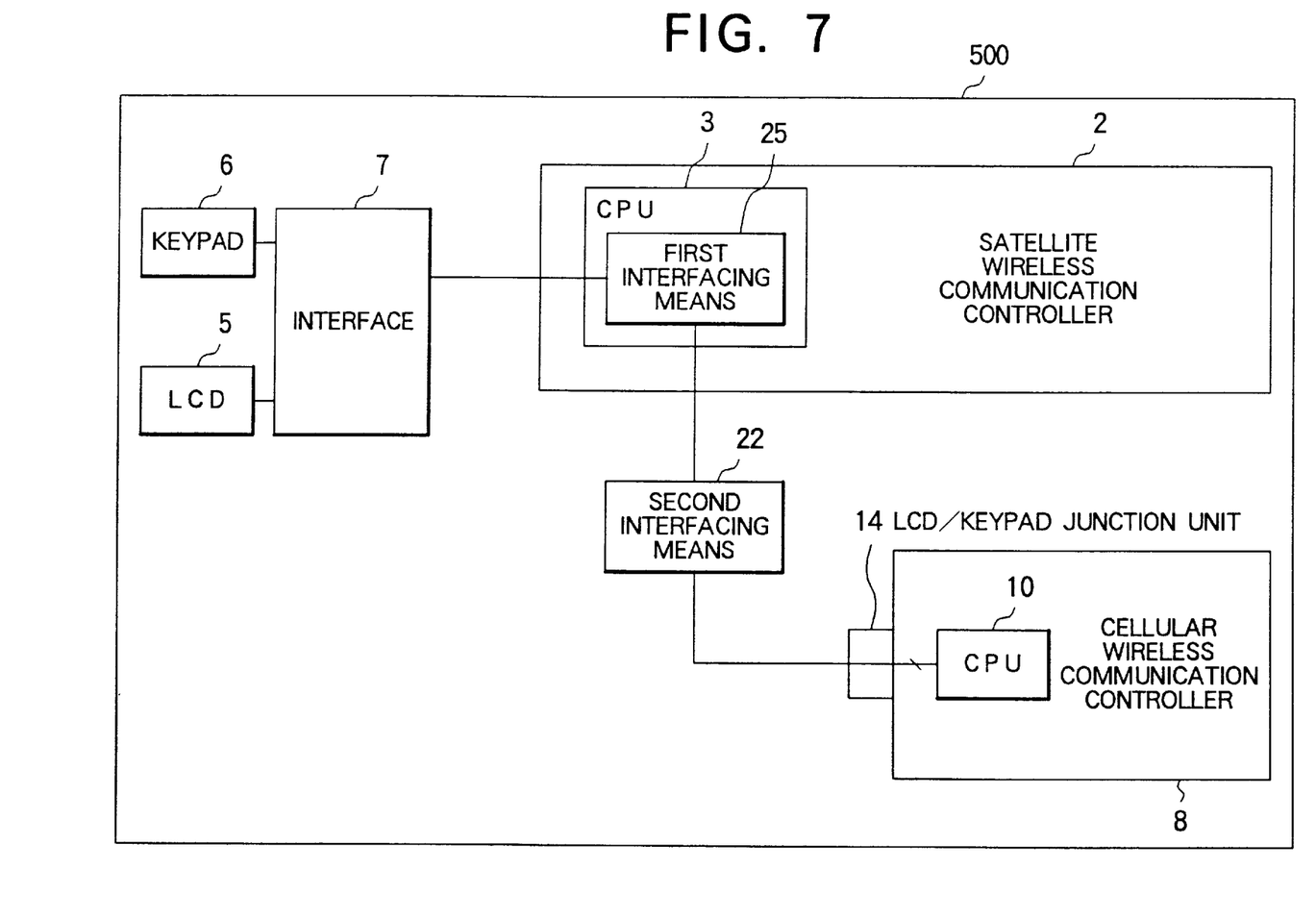
FIG. 7 is a block diagram showing generally a dual-mode mobile telephone terminal apparatus according to a fifth embodiment of the present invention.

FIG. 7 shows generally a dual-mode mobile telephone terminal apparatus 500 of a fifth embodiment of the present invention.

In the dual-mode mobile telephone terminal apparatus 500 of the fifth embodiment, the software interfacing function performed by the first interfacing means 25 under the control of the program is carried out by CPU 3 in the satellite wireless communication controller 2, and specifically, a program for the process carried out by the first interfacing means 23 is added to the program of CPU 3.

The rest of the construction of the fifth embodiment remains unchanged from that of the first embodiment, and components identical to those described in connection with the first embodiment are designated with the same reference numerals and the discussion about them is not repeated.

Since the dual-mode mobile telephone terminal apparatus 500 of the fifth embodiment needs no first interfacing means 23, compact and low-cost designs are implemented in the entire hardware of the apparatus.

(6) Sixth embodiment

Figure 8:
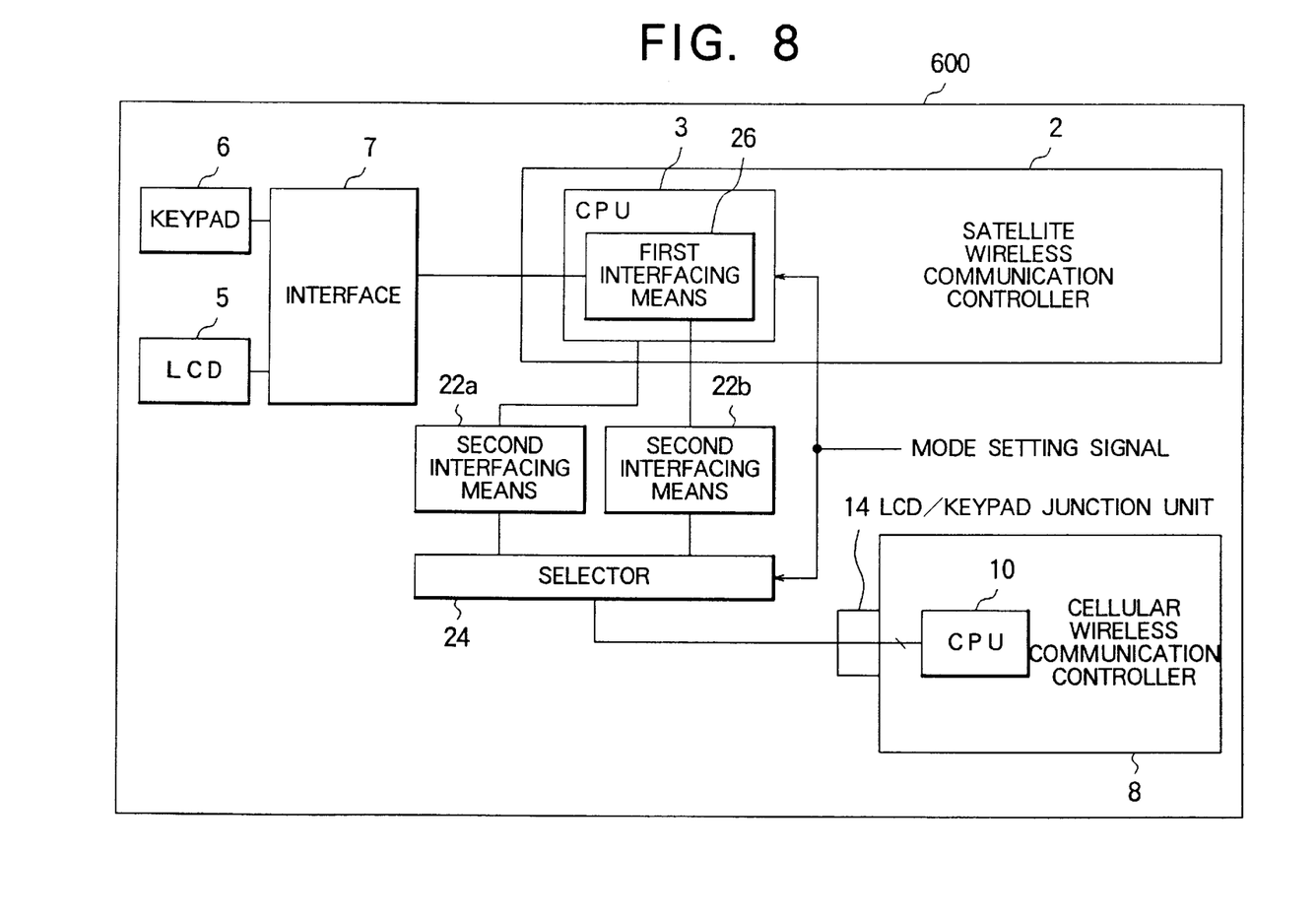
FIG. 8 is a block diagram showing generally a dual-mode mobile telephone terminal apparatus according to a sixth embodiment of the present invention.

FIG. 8 shows generally a dual-mode mobile telephone terminal apparatus 600 of a sixth embodiment of the present invention.

In the dual-mode mobile telephone terminal apparatus 600 of the sixth embodiment, CPU 3 in the satellite wireless communication controller 2 performs the function carried out by the first interfacing means 26, which makes software interfacing for data conversion and other processes by switching the program in response to the mode setting signal for the cellular communication system, and specifically, the program of the first interfacing means 23 is added to the program of CPU 3, and in the same way as in the dual-mode mobile telephone terminal apparatus 400 of the fourth embodiment shown in FIG. 6, the dual-mode mobile telephone terminal apparatus 600 comprises second interfacing means 22a and 22b for making electrical interfacing for a cellular wireless communication controller of a different cellular communication system with different electrical interfacing specifications (two types herein, for simplicity), and a selector 24 for selecting one of the outputs of the second interfacing means 22a and 22b in response to the mode setting signal for the type of cellular communication system.

Even when a cellular wireless communication controller 8 of a different cellular communication system is mounted in the dual-mode mobile telephone terminal apparatus 600 of the sixth embodiment, CPU 3 functions for the first interfacing means 26 with the program of the first interfacing means 26 changed to the one compatible with the mounted cellular communication system, and the appropriate one of the second interfacing means 22a and 22b is automatically selected in response to the mode setting signal for the cellular wireless communication controller 8.

In the same way as in the fourth embodiment, the dual-mode mobile telephone terminal apparatus 600 of the sixth embodiment needs no particular modification even when the cellular wireless communication controller of different cellular communication system is mounted, and since CPU 3 in the satellite wireless communication controller 2 functions for the first interfacing means 26, there is no need for mounting the first interfacing means 26 in hardware, and compared with the fourth embodiment, the hardware component count of the apparatus is reduced and the entire hardware is made compact and less costly.

(7) Seventh embodiment

Figure 9:
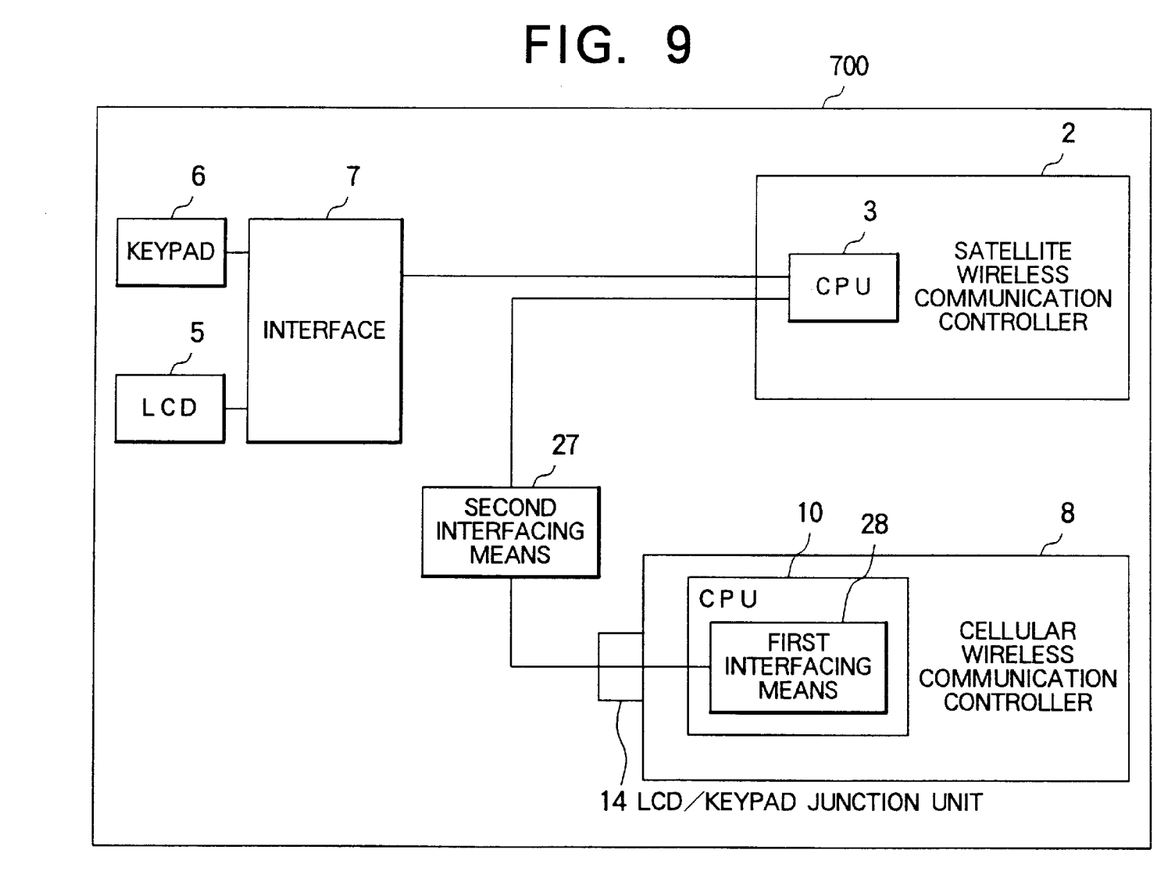
FIG. 9 is a block diagram showing generally a dual-mode mobile telephone terminal apparatus according to a seventh embodiment of the present invention.

FIG. 9 shows generally a dual-mode mobile telephone terminal apparatus 700 of a seventh embodiment of the present invention.

In the dual-mode mobile telephone terminal apparatus 700 of the seventh embodiment, second interfacing means 28 for performing electrical interfacing to a signal from CPU 3 in the satellite wireless communication controller 2 is arranged separately from the satellite wireless communication controller 2 and the cellular wireless communication controller 8, the function of the first interfacing means 28 for performing software interfacing for data format conversion and other processes under the control of a program is added to CPU 10 in the satellite wireless communication controller 2, and specifically, the program for performing the process by the interfacing means 28 is added to the program of CPU 3. The rest of the construction of the seventh embodiment remains unchanged from that of the first embodiment, and components identical to those described in connection with the first embodiment are designated with the same reference numerals.

Since CPU 10 in the cellular wireless communication controller 8 functions for the first interfacing means 28 in the dual-mode mobile telephone terminal apparatus 700 of the seventh embodiment, there is no need for arranging the first interfacing means 28 in hardware, and in the same way as in the fifth embodiment, the hardware component count of the apparatus is reduced and the entire hardware is made compact and less costly.

(8) Eighth embodiment

Figure 10:
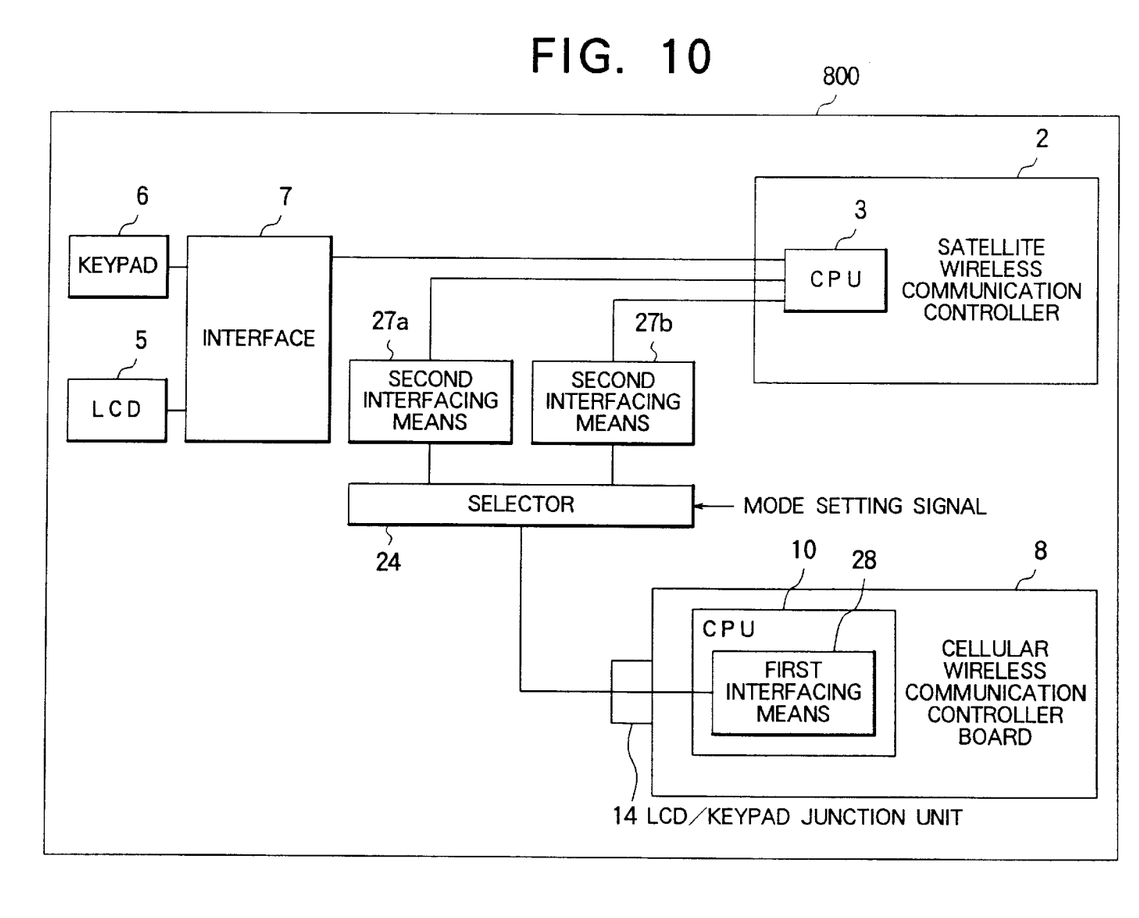
FIG. 10 is a block diagram showing generally a dual-mode mobile telephone terminal apparatus according to an eighth embodiment of the present invention.

FIG. 10 shows generally a dual-mode mobile telephone terminal apparatus 800 of an eighth embodiment of the present invention.

The dual-mode mobile telephone terminal apparatus 800 of the eighth embodiment, like the fourth embodiment, employs a single cellular wireless communication controller 8, and to be compatible with the installation of a cellular wireless communication controller of various cellular communication system type, the dual-mode mobile telephone terminal apparatus 800 comprises the first interfacing means 28 for performing software interfacing for data format conversion and other processes under the control of a program in CPU 10 in the cellular wireless communication controller 8 (for two types herein, for simplicity) expected to be mounted, the second interfacing means 22a and 22b for performing electrical interfacing for the cellular communication system of the cellular wireless communication controller 8 expected to be mounted, arranged separately from the satellite wireless communication controller 2 and the cellular wireless communication controller 8, a selector 24 for selecting one of the outputs of the second interfacing means 22a and 22b in response to the mode setting signal for the type of cellular communication system.

Even if the dual-mode mobile telephone terminal apparatus 800 of the eighth embodiment has a cellular wireless communication controller 8 of a different cellular communication system, like the fourth embodiment, the appropriate one of the second interfacing means 22a and 22b is automatically selected in response to the mode setting signal for the cellular wireless communication controller 8.

Even when the cellular wireless communication controller 8 of a different cellular communication system type is mounted in the dual-mode mobile telephone terminal apparatus 800 of the eighth embodiment, the dual-mode mobile telephone terminal apparatus 800 is compatible with the different cellular communication system type with no particular hardware modification required, as long as the electrical interfacing specifications of the cellular communication system are compatible with the second interfacing means 27a and 27b.

Since the function of the first interfacing means 28 for performing software interfacing for data format conversion and other processes under the control of a program is performed by CPU 10 in the cellular wireless communication controller 8 expected to be mounted, there is no need for a new CPU for carrying out the function of the first interfacing means 28, and the manufacturing cost of the apparatus is reduced accordingly.

Industrial Applicability

Since in the dual-mode mobile telephone terminal apparatus of the present invention as described above, the interfacing between the input/output junction such as the LCD/keypad junction unit 14 in the cellular wireless communication controller and the satellite wireless communication controller is performed by the interfacing means rather than by the external input/output terminal of the cellular terminal module, the hardware modification involved is minimized when cellular wireless communication controllers of a variety of cellular communication systems are incorporated, and the resulting reduced development cost consequently leads an inexpensive dual-mode mobile telephone terminal apparatus, and no hardware modification is involved when one cellular communication system of cellular wireless communication controller is changed to another cellular communication system.

What is claimed is:

1. A dual-mode mobile telephone terminal apparatus comprising a satellite wireless communication controller for performing satellite communications with another terminal apparatus via a communications satellite, a cellular wireless communication controller, including an input/output junction unit, for performing cellular communications with another terminal apparatus via a ground station, and interfacing means, arranged between the satellite wireless communication controller and the input/output junction unit of the cellular wireless communication controller, for making interfacing between the satellite wireless communication controller and the input/output junction unit of the cellular wireless communication controller, wherein the cellular wireless communication controller outputs in/out-of-area information that indicates whether the apparatus is in or out of a cellular communication service area while the satellite wireless communication controller receives the in/out-of-area information from the cellular wireless communication controller, and when the satellite wireless communication controller determines that the apparatus is in the cellular communication service area, the satellite wireless communication controller causes the cellular wireless communication controller to perform cellular communications, and when the satellite wireless communication controller determines that the apparatus is out of the cellular communication service area, the satellite wireless communication controller performs satellite communications.

2. A dual-mode mobile telephone terminal apparatus comprising a satellite wireless communication controller for performing satellite communications with another terminal apparatus via a communications satellite, a cellular wireless communication controller, including an input/output junction unit, for performing cellular communications with another terminal apparatus via a ground station, and interfacing means, arranged between the satellite wireless communication controller and the input/output junction unit of the cellular wireless communication controller, for making interfacing between the satellite wireless communication controller and the input/output junction unit of the cellular wireless communication controller, further comprising a plurality of cellular wireless communication controllers of different cellular communication system types, first interfacing means for making software interfacing under the control of a program compatible with the cellular communication system of one cellular wireless communication controller in use, out of the plurality of cellular wireless communication controllers, and a plurality of second interfacing means, respectively arranged for the plurality of cellular wireless communication controllers, for performing electrical interfacing, wherein when one of the plurality of cellular wireless communication controllers performs cellular communications, the first interfacing means makes software interfacing under the control of the program compatible with the cellular communication system of the one cellular wireless communication controller while the second interfacing means makes electrical interfacing compatible with the one cellular wireless communication controller, in connection with the interfacing activity between the satellite wireless communication controller and the input/output junction unit of the cellular wireless communication controllers.

3. A dual-mode mobile telephone terminal apparatus comprising a satellite wireless communication controller for performing satellite communications with another terminal apparatus via a communications satellite, a cellular wireless communication controller, including an input/output junction unit, for performing cellular communications with another terminal apparatus via a ground station, and interfacing means, arranged between the satellite wireless communication controller and the input/output junction unit of the cellular wireless communication controller, for making interfacing between the satellite wireless communication controller and the input/output junction unit of the cellular wireless communication controller, further comprising, in the interfacing means, first interfacing means for making software interfacing under the control of a program compatible with the cellular communication system of one cellular wireless communication controller actually mounted, out of a plurality of cellular wireless communication controllers of different cellular communication system types expected to be mounted, a plurality of second interfacing means, respectively arranged for the plurality of cellular wireless communication controllers, for performing electrical interfacing, with the first interfacing means arranged separately from the plurality of second interfacing means, and selection means for selecting one second interfacing means, among the plurality of second interfacing means, compatible with the mounted cellular wireless communication controller, wherein when one of the plurality of cellular wireless communication controllers performs cellular communications, the first interfacing means makes software interfacing under the control of the program compatible with the cellular communication system of the one cellular wireless communication controller, while the second interfacing means makes electrical interfacing compatible with the one cellular wireless communication controller selected by the selection means, in connection with the interfacing activity between the satellite wireless communication controller and the input/output junction unit of the cellular wireless communication controllers.

4. A dual-mode mobile telephone terminal apparatus according to claim 3, wherein the CPU that executes the program in the satellite wireless communication controller to perform satellite communications further makes software interfacing under the control of the program of the first interfacing means for the first interfacing program.

5. A dual-mode mobile telephone terminal apparatus according to claim 3, wherein the CPU that executes the program in the cellular wireless communication controller to perform cellular communications further makes software interfacing of the first interfacing means for the first interfacing means.

* * * * *